Oct. 14, 1930.  C. H. BAKER  1,778,658
SWIVEL JOINT FOR ELECTRICAL FITTINGS
Filed Aug. 22, 1925
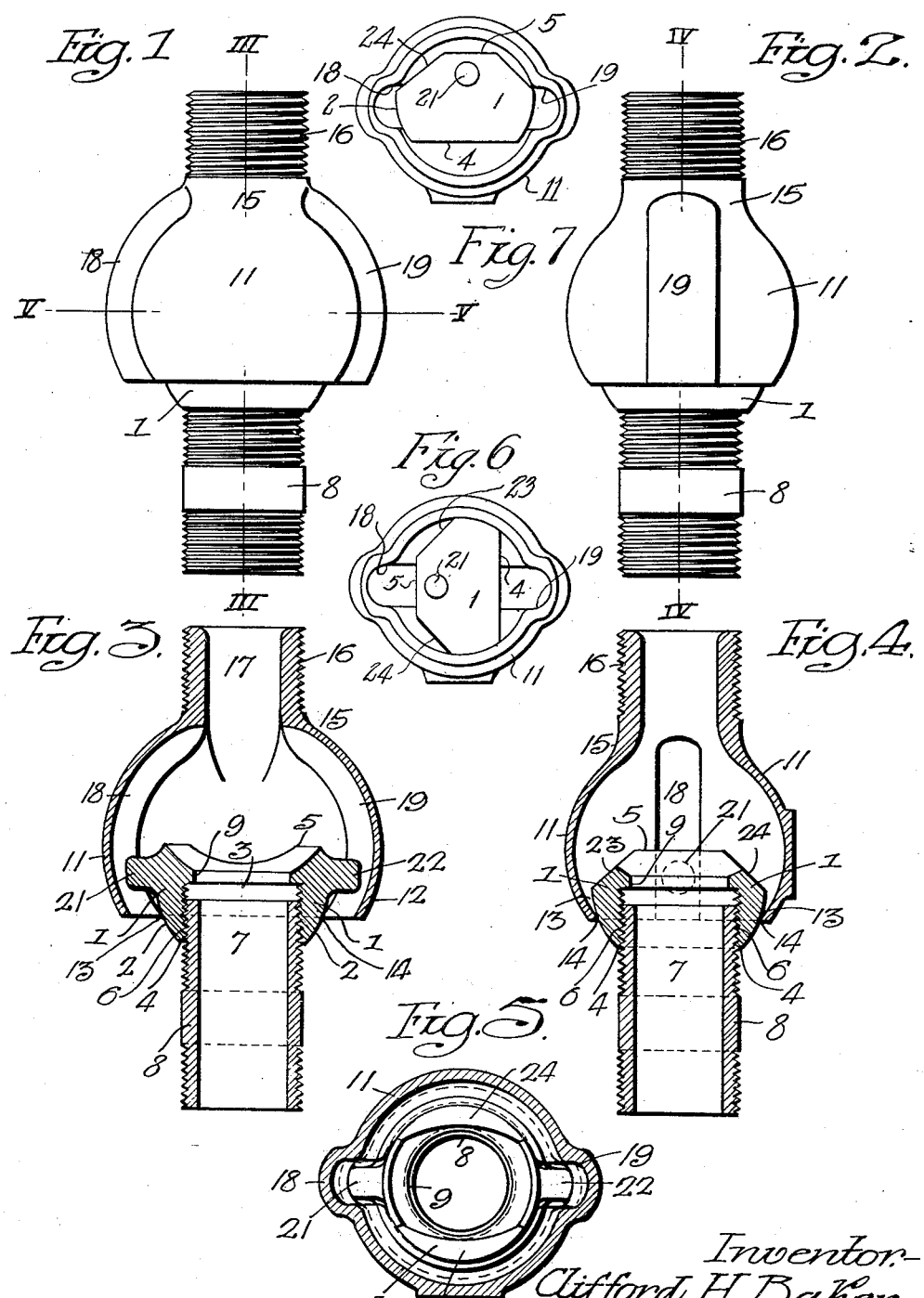
Inventor-
Clifford H. Baker.
by his Attorneys.-
Howson & Howson Patented Oct. 14, 1930

1,778,658

UNITED STATES PATENT OFFICE

CLIFFORD H. BAKER, OF PHILADELPHIA, PENNSYLVANIA, ASSIGNOR TO V. V. FITTINGS COMPANY, OF PHILADELPHIA, PENNSYLVANIA, A CORPORATION OF PENNSYLVANIA

SWIVEL JOINT FOR ELECTRICAL FITTINGS

Application filed August 22, 1925. Serial No. 51,734.

My invention relates to hangers for electrical fixtures and the like, and it has for one object the provision of a hanger that is suitable for inexpensive quantity production methods of manufacture and that comprises parts permitting the elimination of expensive molding operations heretofore considered essential.

Another object of my invention is to provide a hanger embodying a ball and socket joint, whereby a perfectly plumb fixture may be assured while preventing the turning of the fixture an amount sufficient to damage the wiring.

A further object of my invention is to provide a hanger having a ball and socket joint, the elements of which are detachable upon relative movements about predetermined axes.

With these and other objects and applications in mind, my invention further consists in the details of construction and operation and arrangement, hereinafter described and claimed and illustrated in the accompanying drawings, wherein Figs. 1 and 2 are front and side elevational views, respectively, of a hanger embodying my invention;

Figs. 3 and 4 are vertical sectional views taken on the lines III—III and IV—IV of Figs. 1 and 2, respectively;

Fig. 5 is a sectional plan view, taken on the line V—V of Fig. 1; and

Figs. 6 and 7 are inverted plan views showing the position of the ring for successive ninety degree movements about horizontal and vertical axes.

Referring to the drawing, a ring 1 constituting one element of a ball and socket joint is provided with a side surface 2 and it also has a central passage 3 which extends from a lower side 4 to an upper side 5 thereof. A lower portion 6 of the passage 3 is threaded to receive one end 7 of a fixture-supporting rod 8. An inner flange 9 serves to limit the movement of the tubular rod 8 into the threaded portion 6 of the passage 3.

Another element of the ball and socket joint comprises a spherical casing 11, a lower end portion 12 of which is provided with an opening 13 permitting a portion of the spherical ring 1 to extend therethrough while seated on an inner edge 14, as shown particularly in Figs. 3 and 4. An upper end 15 of the spherical socket 11 is provided with a threaded tubular extension 16 forming a passage 17 for wires (not shown), which is directly in alignment with the passage of the fixture-supporting rod 8.

The turning of the fixture-supporting rod 8 relative to the supporting socket 11 may be prevented by providing the latter with pair of oppositely positioned keyways 18 and 19 which extend respectively from the upper passage 17 to the lower opening 13. A pair of lugs 21 and 22 respectively extend from the spherical ring 1 into the keyways 18 and 19 and loosely engage the same.

The relative dimensions of the socket opening 13 and the spherical ring 1 are such that the fixture-supporting rod 8 engages the casing 11 before the lugs 21 and 22 are disengaged from their respective keyways 18 and 19. However, when the fixture-supporting rod 8 has been removed, the spherical ring 1 may be turned about a horizontal axis into the position of Fig. 6, wherein the lugs 21 and 22 are clear of the keyways 18 and 19. The spherical ring 1 may now be further turned about a vertical axis into the position of Fig. 7 wherein the sides of the ring 1 are positioned between the keyways 18 and 19. In order to permit the ring 1 to be removed from the socket 11 through the opening 13 when it occupies this position, the upper side 5 of the ring 1 is beveled at 23 and 24, as shown in Figs. 3, 4 and 5. It will be noted that the additional space provided by the keyways 18 and 19 very greatly decreases the extent of the beveling at 23 and 24. Hence, the ring 1 may be removed from the socket 11 only when the fixture-supporting rod 8 has been removed and the ring 1 turned successively on horizontal and vertical axes.

The hanger embodying my invention thus permits the socket 11 and the ball element 1 to be cast separately rather than together, as has been the practice heretofore. The parts may be assembled in the reverse manner to that above described for their separation, that is, the ring element 1 is inserted in the socket 11 through the opening 13 and successively turned on vertical and horizontal axes, whereupon the fixture-supporting rod 8 is threaded into the passage 3 of the ring 1.

While I have shown only one form of embodiment of my invention, for the purpose of describing the same and illustrating its principles of construction and operation, it is apparent that various changes and modifications may be made therein without departing from the spirit of my invention.

I claim:

1. A ball and socket joint comprising a unitary socket member having a spherical ball receiving chamber and a circular opening permitting the insertion of the ball element into such chamber, the walls of the opening upon one diameter having coves increasing the effective width of the opening and a ball element having a maximum diameter greater than the diameter of said opening and at one side of a plane intersecting the same upon the maximum diameter deformed to permit offsetting of the ball element when in a predetermined position to bring said maximum diameter in alignment with the coves and thereby permit the ball element to be inserted or removed.

2. A ball and socket joint comprising a unitary socket member having a spherical ball receiving chamber and a circular opening permitting the insertion of the ball element into such chamber, the walls of the opening upon one diameter having coves increasing the effective width of the opening and a ball element having a maximum diameter greater than the diameter of said opening and at one side of a plane intersecting the same upon the maximum diameter deformed to permit offsetting of the ball element when in a predetermined position to bring said maximum diameter in alignment with the coves and thereby permit the ball element to be inserted or removed, said coves comprising the ends of grooves formed in the walls of the chamber, the ball element having portions to engage the said grooves.

CLIFFORD H. BAKER.